United States Patent
Schauer et al.

(10) Patent No.: US 7,014,025 B2
(45) Date of Patent: Mar. 21, 2006

(54) PRESSURE PLATE ASSEMBLY FOR A FRICTION CLUTCH

(75) Inventors: Alfred Schauer, Arnstein (DE); Bernd Kuhn, Löffelsterz (DE); Thomas Schubert, Grettstadt (DE); Jürgen Pfeifer, Gochsheim (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/787,566

(22) Filed: Feb. 26, 2004

(65) Prior Publication Data

US 2004/0200686 A1 Oct. 14, 2004

(30) Foreign Application Priority Data

Apr. 9, 2003 (DE) ................................ 103 16 145

(51) Int. Cl.
*F16D 13/69* (2006.01)
(52) U.S. Cl. ............................... 192/70.28; 192/70.27; 192/89.24
(58) Field of Classification Search ............. 192/70.27, 192/70.28, 89.24, 109 A
See application file for complete search history.

(56) References Cited

U.S. PATENT DOCUMENTS

| | | | | | |
|---|---|---|---|---|---|
| 2,600,520 | A | * | 6/1952 | Spase | 192/70.21 |
| 3,174,602 | A | * | 3/1965 | Schjolin | 192/70.14 |
| 4,114,740 | A | * | 9/1978 | Sugiura et al. | 192/70.18 |
| 4,362,227 | A | * | 12/1982 | Walton et al. | 192/70.28 |

FOREIGN PATENT DOCUMENTS

JP 55060728 A * 5/1980

* cited by examiner

*Primary Examiner*—Richard M. Lorence
(74) *Attorney, Agent, or Firm*—Cohen, Pontani, Lieberman & Pavane

(57) ABSTRACT

A housing arrangement can be connected to a flywheel for rotation in common around an axis of rotation, and a pressure element is connected to the housing arrangement for rotation in common around the axis of rotation but is able to shift in the axial direction. A release spring arrangement includes at least one spring element which acts on the pressure element and is supported against the flywheel after the housing arrangement has been attached to the flywheel. Each spring element is held in place on the pressure element by means of a fastening element.

9 Claims, 3 Drawing Sheets

PRESSURE PLATE ASSEMBLY FOR A FRICTION CLUTCH

BACKGROUND OF THE INVENTION

1. Field of the Invention

The present invention pertains to a pressure plate assembly for a friction clutch, comprising a housing arrangement, which is or can be connected to a flywheel for rotation in common around an axis of rotation; a pressure element, which is connected to the housing arrangement for rotation in common around the axis of rotation and which can shift in the axial direction; and a release spring arrangement, comprising at least one spring element, which acts on the pressure element and is supported against the flywheel after the housing arrangement has been attached to the flywheel.

2. Description of the Related Art

These types of pressure plate assemblies, which can also be designed, for example, as pressure plate assemblies for multi-disk clutches, are usually delivered by the manufacturer in a state in which the pressure plate assembly is not attached to the flywheel or the like. This results in the problem that a release spring arrangement or the individual spring elements of this arrangement which are intended to act between the flywheel and a pressure element forming part of the pressure plate assembly by shifting the pressure element axially during the performance of clutch-disengaging operations can easily fall out of the assembly to be delivered.

SUMMARY OF THE INVENTION

The task of the present invention is to provide measures for a pressure plate assembly forming part of a friction clutch so that this assembly can be delivered in the proper, complete state and can be attached to the flywheel without any further measures.

According to the invention, the at least one spring element is held in position on the pressure element by means of a fastening element.

The fixation of the release spring arrangement or of the spring elements of that arrangement on a pressure element by the use of a fastening element avoids the danger that the spring elements can fall off the pressure element during transport and/or avoids the necessity of transporting the pressure plates in a defined position, such as with the side facing the flywheel facing upward, to avoid the loss of the spring elements.

It is possible, for example, for the fastening element to have a body area, which passes through an opening in the pressure element, and a head area, which is larger than the body area and which holds the spring element on the pressure element.

Especially when the spring element is a helical compression spring, one end of which is supported against the pressure element, it is advantageous for the fastening element to hold the helical compression spring by one end on the pressure element. This can be done without complicated design measures by, for example, reducing the inside dimensions of one end area of the helical compression spring and by holding the area of the spring with reduced dimensions between the head area of the fastening element and the pressure element. The body area and the expanded head area of the fastening element are therefore inserted through the helical compression spring, so that the body area emerges again from the end of the helical compression spring, whereas the expanded head area remains in the helical compression spring, i.e., in the end area of reduced internal dimensions, and thus holds this end area on the pressure element after the body area has been inserted into the intended opening in the pressure element.

So that a spring element can be held stably, especially when it is designed as a helical spring, it can be advantageous for at least certain areas of the head area of the fastening element to engage between two turns of the helical compression spring in the one end area.

To obtain a very stable anchoring of the fastening element and thus also of the spring element being held on the pressure element, it is proposed that the fastening element have a second head area and that these two head areas grip the pressure element on opposite axial sides. In the case of a fastening element designed with two head areas, it is also possible, especially when the pressure plate assembly according to the invention is designed as a so-called dual-disk clutch, for a spring element of a release spring arrangement acting between the pressure element and an additional pressure element to be held in place on the pressure element by the additional head area. Thus, by means of a single fastening element, it is possible for two spring elements, each of a different release spring arrangement, to be held firmly on the pressure element.

The fastening element can be made of heat-resistant material, such as metal, so that it can withstand the high temperatures which occur as a result of operation under frictional conditions. The fastening element can also be designed as a hollow rivet.

As already explained above, the design of a pressure plate assembly according to the invention can be used especially when this assembly is designed as a dual-disk clutch. In this case, it is then possible for the pressure plate assembly to have a pressure plate as the first pressure element, force being exerted on this pressure plate by a force-exerting arrangement, which is supported against the housing arrangement, to perform clutch-engaging operations; for an intermediate plate to be provided as the second pressure element; for a first release spring arrangement to act between the intermediate plate and the flywheel after the housing arrangement has been connected to the flywheel; and for a second release spring arrangement to act between the pressure plate and the intermediate plate.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
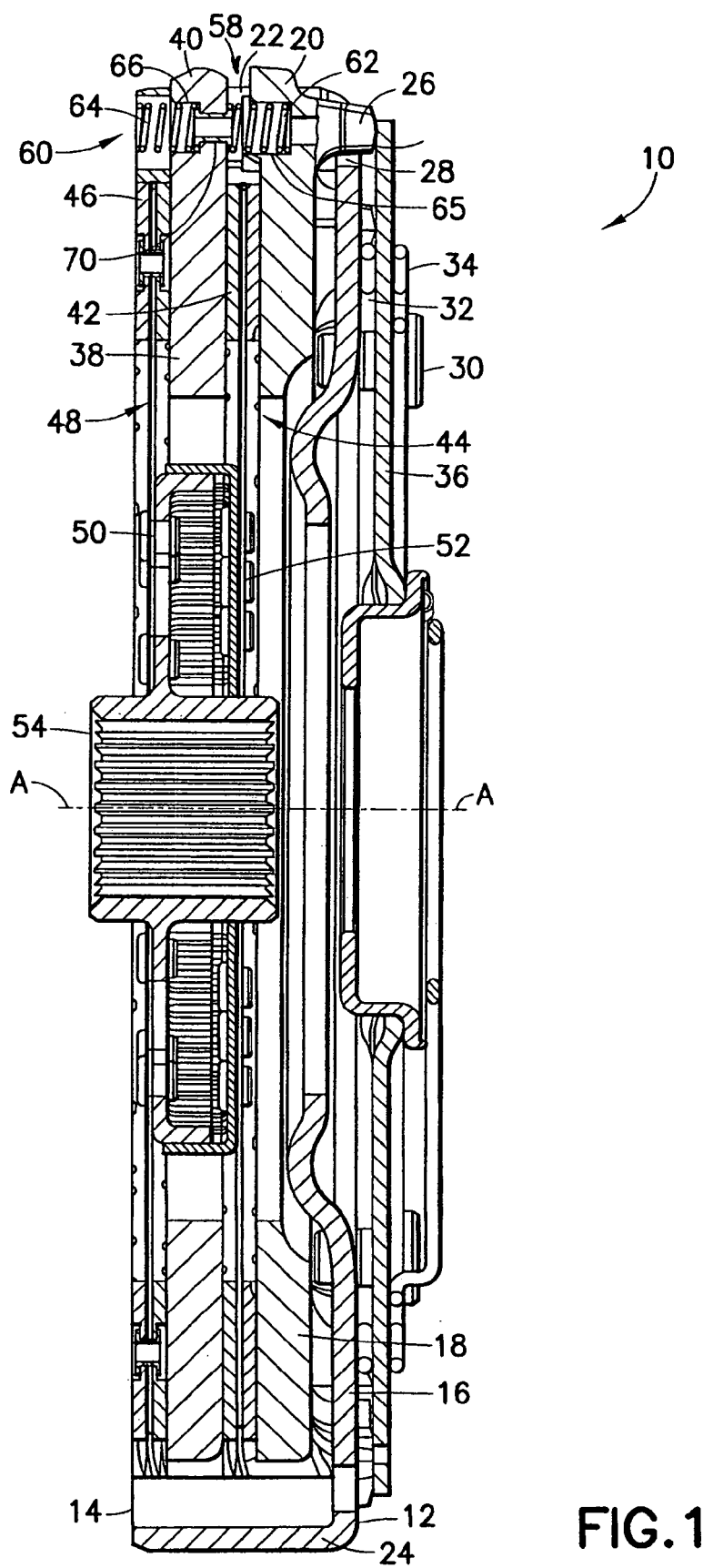
FIG. 1 shows a longitudinal cross section through a pressure plate assembly according to the invention for a dual-disk clutch.

FIG. 1 shows a longitudinal cross section through a pressure plate assembly 10 for a dual-disk friction clutch, the section being made along the axis of rotation. The pressure plate assembly 10 comprises a pot-like housing 12, made of metal sheet or plate, for example, which can be attached on one axial side 14 to a flywheel (not shown) to complete a friction clutch and which, on the other axial side, has a ring-like bottom area 16. In the space enclosed by the housing 12, there is a pressure plate 18 with a ring-like shape. The pressure plate 18 has radial projections 20 at several points around the circumference so that the plate can be connected to the housing 12 for rotation in common; these projections engage in associated openings 22 in the section 24 of the housing 12, which extends essentially in the axial direction. In this way, the pressure plate 20 is connected to the housing 12 for rotation in common around the axis A, but is still free to shift relative to the housing 12 in the direction in which the axis of rotation A extends. On the side facing the bottom area 16, the pressure plate 18 has several axial projections 26, which pass through associated openings 28 in the housing 12. In addition, an energy-storage device 36, designed as a diaphragm spring or the like, is supported on the ring-like bottom area 16 by several spacer bolts 30 and intermediate wire rings 32, 34. Because it is supported by the spacer bolts 30 against the housing 12, the energy-storage device 36 is able to press the pressure plate 18 toward the end area 14 of the housing 12 and thus to achieve the engaged state.

On the side of the pressure plate 18 facing away from the ring-like bottom area 16 of the housing 12, a ring-like intermediate plate 38 is provided. The radially outer part of this intermediate plate also carries radial projections 40, which engage in the openings 22 in the housing 12. In this way, this intermediate plate 38 is also connected in basically nonrotatable fashion to the housing 12, but is still able to shift relative to the housing in the same direction as that of the axis of rotation A.

The friction linings 42 of a first clutch disk area 44 are located between the pressure plate 18 and the intermediate plate 38. The friction linings 46 of a second clutch disk area 48 are provided on the side of the intermediate plate 38 facing away from the pressure plate 18 and toward the flywheel. The two clutch disk areas 44, 48 are connected nonrotatably to each other in their radially inner area by carrier elements 50, 52, but are able to shift relative to each other in the same direction as that of the axis of rotation A. For example, the carrier element 50 can be attached to a common hub 54 of the two clutch disk areas 44, 48. In this way, the friction clutch shown in FIG. 1 works as a dual-disk clutch, as a result of which, for only a slight increase in axial length, a doubling of the overall effective friction surface area can be achieved.

So that, in order to perform disengaging operations, both the pressure plate 18 and the intermediate plate 38 can be moved away in a suitable manner from the friction linings 42, 46 frictionally interacting with them, two release spring arrangements 58, 60 are provided. The release spring arrangement 58 comprises several helical compression springs 62, positioned in the radially outer area between the pressure plate 18 and the intermediate plate 38. The release spring arrangement 60 comprises several helical compression springs 64, which are positioned in the same radial and preferably also in the same circumferential area as the respective helical compression springs 62 with which the compression springs 64 are substantially axially aligned while being supported between the intermediate plate 38 and the flywheel. So that radial guidance can be provided for these helical compression springs 62, 64, recesses 65, 66 can be provided, one in the pressure plate 18, the other in the intermediate plate 38, in correlation with each of the helical compression springs 62, 64, the dimensions of these recesses being approximately the same as the outer dimensions of the springs 62, 64.

To ensure that, in the as-delivered condition of the pressure plate assembly 10 shown by way of example in FIG. 1, especially the springs 64 of the release spring arrangement 60 are not lost and are instead held reliably on the intermediate plate 38 until the pressure plate assembly 10 can be attached to the flywheel, each helical compression spring 64 is, according to the present invention, held on the intermediate plate 38 by its own fastening element 70.

Figure 2:
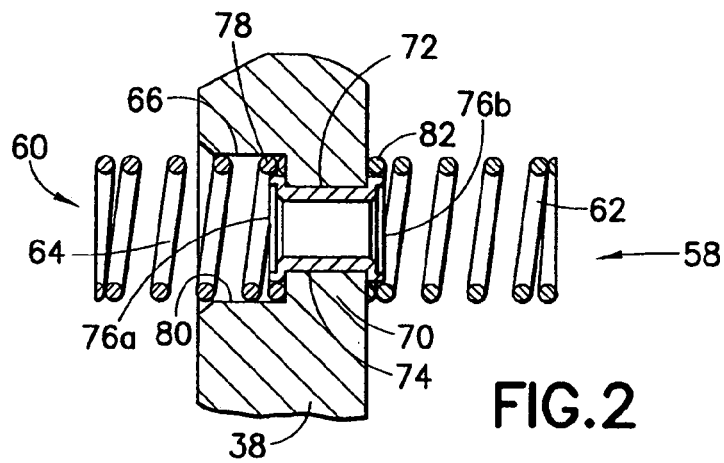
FIG. 2 shows a detailed view which illustrates the cooperation between an intermediate plate and the release springs.
Figure 3:
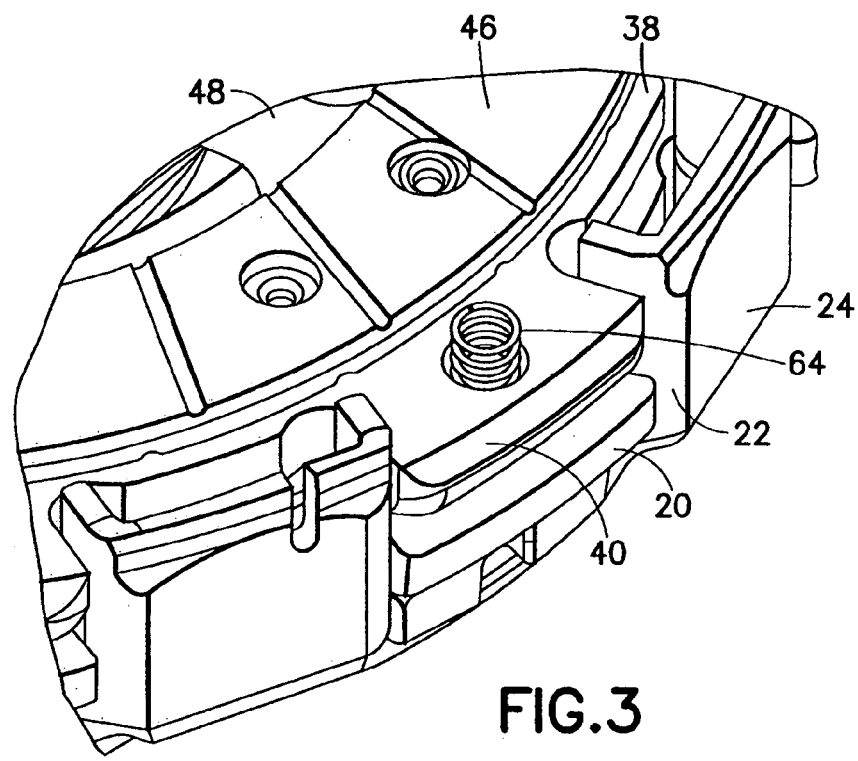
FIG. 3 shows a detailed, perspective view of the pressure plate assembly of FIG. 1.
Figure 4:
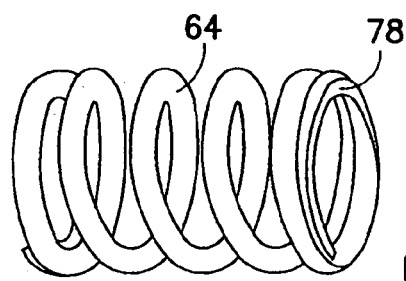
FIG. 4 shows a perspective view of a helical compression spring acting as a release spring.

It can be seen in FIG. 2 that the fastening element 70, which is designed here as a hollow rivet, has a body area 72, which passes through a section 74 of reduced interior dimensions of the recess 66. On both axial sides of the intermediate plate 38, expanded head areas 76a, 76b adjoin the body area 72; these head areas thus grip the intermediate plate 38 on both axial sides and thus prevent the fastening element 70 from escaping from the intermediate plate 38. An end area 78 of the helical compression spring 64 is held on the intermediate plate 38 by the expanded head area 76a. For this purpose, this helical compression spring 64, which is also shown in FIG. 4, can be designed with reduced internal dimensions in its end area 78. Another possible alternative is for the head area 76a to engage between successive axial turns of the helical compression spring 64 and/or, in the installation situation shown in FIG. 2, for it to press the end area 78 radially outward against an inner circumferential wall 80 of the recess 66.

It can also be seen in FIG. 2 that a helical compression spring 62 of the release spring arrangement 58 following the helical compression spring 64 in the axial direction is held in place by this same fastening element 70 on the intermediate plate 38. Here, too, the expanded head area 76b can hold an end area 82 of the helical compression spring 62 by engaging between turns or by gripping the end section. In this way, a connection is produced between the intermediate plate 38 and the two release spring arrangements 58, 60, which facilitates the insertion of these assemblies into the clutch housing 12.

Figure 5:
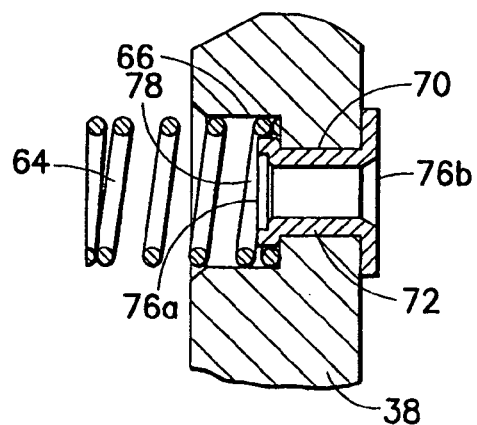
FIG. 5 shows a view corresponding to FIG. 2 of an alternative embodiment.
Figure 6:
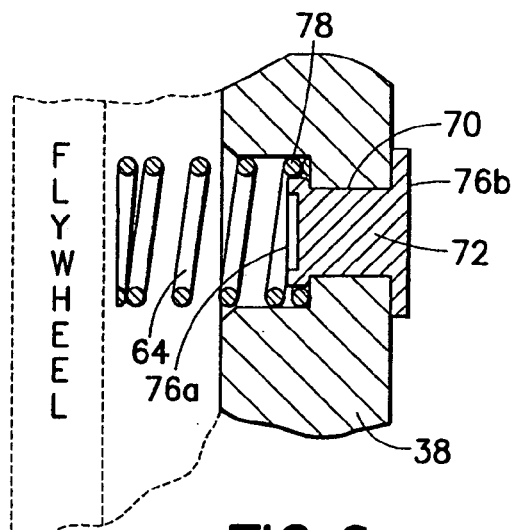
FIG. 6 shows another view corresponding to FIG. 2 of an alternative embodiment.
Figure 7:
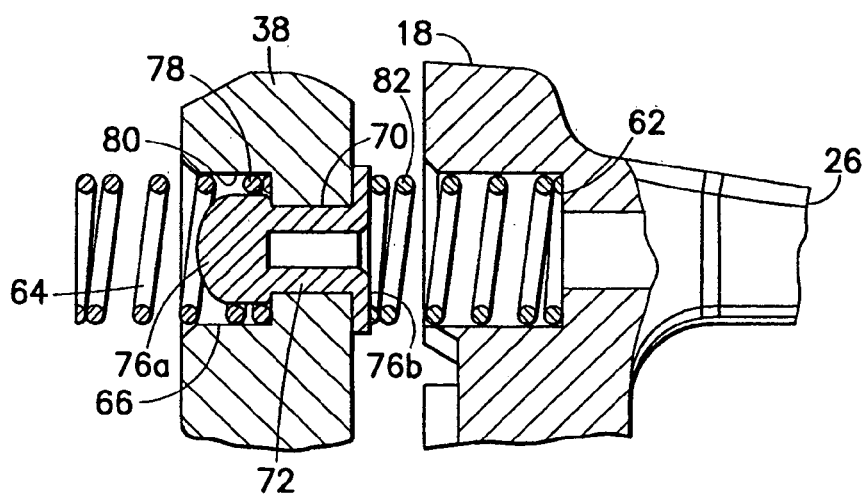
FIG. 7 shows another view corresponding to FIG. 2 of an alternative embodiment.

FIGS. 5–7 show various alternative embodiments of fastening elements 70. Thus, first, FIG. 5 shows the fastening element 70 designed as a hollow rivet with its essentially hollow cylindrical body area 72 and expanded head area 76a, which holds the helical compression spring 64 on the intermediate plate 38. On the other axial side, however, the expanded head area 76b is no longer designed so that it can hold a helical compression spring 62 of the release spring arrangement 58; instead, it is designed so that, for example, it forms a support surface for this type of helical compression spring 62. In the design variant shown in FIG. 6, the fastening element 70 is basically designed as shown in FIG. 5, but it does not have the form of a hollow rivet. Instead, the body area 72 is solid, that is, filled. In the exemplary embodiment shown in FIG. 7, the fastening element 70 is provided with dome-like head area 76a, by means of which the end area 78 of the helical compression spring 64 is spread apart radially and thus pressed against the inside circumferential surface 80 of the recess 66. The head area 76b at the other axial end again forms here a support surface for a helical compression spring 62 of the release spring arrangement 58. The body area 72 is hollow.

Especially in the embodiments according to FIGS. 5–7, the fastening element 70 can be installed in the intermediate plate 38 by first fitting the expanded head area 76a into an associated helical compression spring 64, then by inserting the body area 72 of the element through the recess 66, and finally by deforming the axial side of the element facing away from the pressure plate 18 to form the head area 76b.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pressure plate assembly for a friction clutch, comprising:
   a housing which can be attached to a flywheel for rotation in common about an axis of rotation;
   a pressure element connected to the housing for rotation in common about the axis of rotation, the pressure element being axially movable with respect to the housing and comprising at least one opening which receives a respective at least one fastening element, the fastening element comprising a body which extends through the opening and a first head, the first head being larger than the body; and
   a first release spring arrangement comprising at least one helical compression spring which has an end held in place on the pressure element by the first head of the respective at least one fastening element, the at least one helical compression spring being supported on the flywheel and acting on the pressure element after the housing has been attached to the flywheel.

2. A The pressure plate assembly of claim 1 wherein the end of the helical compression spring has reduced inside dimensions, the end being held between the first head and the pressure element.

3. A The pressure plate assembly of claim 2, wherein said helical compression spring comprises a plurality of turns, at least part of the first head engaging between at least two turns.

4. The pressure plate assembly of claim 1, wherein each said fastening element has a second head opposite the first head, the first and second heads gripping the pressure element on opposite axial sides.

5. The pressure plate assembly of claim 4, further comprising a second release spring arrangement comprising at least one spring element which is held in place on the pressure element by the second head of the at least one said fastening element, the at least one spring element of the second release spring arrangement acting between the pressure element and an additional pressure element.

6. The pressure plate assembly of claim 1, wherein the fastening element is made of metal.

7. The pressure plate assembly of claim 1, wherein the fastening element is a hollow rivet.

8. A pressure plate assembly for a friction clutch, comprising:
   a housing which can be attached to a flywheel for rotation in common rotatable about an axis of rotation;
   a pressure plate connected to the housing for rotation in common about the axis of rotation, the pressure plate being axially movable with respect to the housing;
   a force exerting arrangement supported against the housing and exerting force against the pressure plate to perform clutch engaging operations;
   an intermediate plate axially spaced from the force exerting arrangement so that the pressure plate is mounted between the force exerting arrangement and the intermediate plate;
   a first release spring arrangement comprising at least one spring element which is held in place on the intermediate plate by a respective at least one fastening element, the at least one spring element being supported on the flywheel and acting between the flywheel and the intermediate plate after the housing has been attached to the flywheel; and
   a second release spring arrangement comprising at least one spring element which is held in place on the intermediate plate by the respective at least one fastening element so that the release spring elements of the first and second release spring arrangements extend coaxially with one another, the at least one spring element of the second release arrangement being supported on the pressure plate and acting between the intermediate plate and the pressure plate.

9. A pressure plate assembly for a friction clutch, comprising:
   a housing which can be attached to a flywheel for rotation in common about an axis of rotation;
   a pressure element connected to the housing for rotation in common about the axis of rotation, the pressure element being axially movable with respect to the housing and comprising at least one opening which receives a respective fastening element, the fastening element comprising a body, which extends through the opening, and first and second axially spaced apart heads, which grip the pressure element on opposite axial sides, the first head being larger than the body;
   a first release spring arrangement comprising at least one spring element received in the first head so as to be held in place on the pressure element, the at least one spring element being supported on the flywheel and acting on the pressure element after the housing has been attached to the flywheel; and
   a second release spring arrangement comprising at least one spring element which is held in place on the pressure element by the second head of the at least one said fastening element, the at least one spring element of the second release spring arrangement acting between the pressure element and an additional pressure element.

* * * * *